United States Patent
Kington et al.

(10) Patent No.: US 7,946,177 B2
(45) Date of Patent: May 24, 2011

(54) METHOD FOR DETECTING DEVIATION IN CRYSTALLOGRAPHIC ORIENTATION IN A METAL STRUCTURE

(75) Inventors: Harry Lester Kington, Scottsdale, AZ (US); Surendra Singh, Chandler, AZ (US); Mark C. Morris, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 366 days.

(21) Appl. No.: 12/276,969

(22) Filed: Nov. 24, 2008

(65) Prior Publication Data

US 2010/0126276 A1    May 27, 2010

(51) Int. Cl.
*G01H 5/00* (2006.01)
(52) U.S. Cl. .......... 73/597; 73/579; 73/602; 73/620
(58) Field of Classification Search .......... 73/579, 73/597, 598, 600, 602, 620, 627, 628, 630
See application file for complete search history.

(56) References Cited

U.S. PATENT DOCUMENTS

| | | | | |
|---|---|---|---|---|
| 4,899,589 A | * | 2/1990 | Thompson et al. | 73/597 |
| 5,631,424 A | * | 5/1997 | Nieters et al. | 73/598 |
| 5,804,727 A | * | 9/1998 | Lu et al. | 73/597 |
| 5,936,726 A | * | 8/1999 | Takeda et al. | 356/237.2 |
| 5,955,671 A | | 9/1999 | Gilmore et al. | |
| 6,494,098 B1 | * | 12/2002 | Leybovich | 73/620 |
| 7,237,438 B1 | | 7/2007 | Umbach et al. | |

OTHER PUBLICATIONS

Green, Jr., et al. "Ultrasonic Orientation Determination of Single Crystals," Acoustical Society of America, 1967, pp. 84-90, vol. 41, New York, USA.
Tang, S.-H. et al. "Ultrasonic Characterization of Point Defects Induced by Cross Slip Under Pure Shear," Theoretical and Applied Fracture Mechanics, 2005, pp. 169-180.
He, Bobing et al. "Ultrasonic Measurement of Orientation in HDPE/iPP Blends Obtained by Dynamic Packing Injection Molding," Polymer, Mar. 22, 2006, vol. 47, Issue 7, pp. 2448-2454.

* cited by examiner

*Primary Examiner* — Jacques M Saint Surin
(74) *Attorney, Agent, or Firm* — Ingrassia Fisher & Lorenz, P.C.

(57) ABSTRACT

A method of detecting a deviation angle in a single-crystal metal structure is disclosed. The single-crystal metal structure has a crystallographic orientation, a length, a first side, a second side, and a first axis extending through the structure. The method comprises determining the length of the single-crystal metal structure along the first axis, transmitting a signal through the single-crystal metal structure from the first side, the signal oriented to propagate along the first axis, receiving the signal, determining a time-of-flight for the signal to traverse the length from the first side to the second side, determining a speed of the signal based on the time-of-flight and the length, and comparing the speed of the signal to a reference speed to detect the deviation angle.

20 Claims, 4 Drawing Sheets

METHOD FOR DETECTING DEVIATION IN CRYSTALLOGRAPHIC ORIENTATION IN A METAL STRUCTURE

TECHNICAL FIELD

Embodiments of the subject matter described herein relate generally to detecting deviation in crystallographic orientation from a desired orientation. More particularly, embodiments of the subject matter relate to ultrasonic techniques for detecting deviation in crystallographic orientation in a single-crystal metal structure.

BACKGROUND

Certain devices and components are constructed of metals which are formed from a single crystal structure. The crystal shape is formed from a repeated atomic cellular structure. Crystal cells can have different atomic configurations, such as simple cubic, body-centered cubic, face-centered cubic, and so on. The structure of the crystal cell determines certain mechanical properties of the metal, including its modulus of elasticity (Young's modulus) and fatigue strength, among others.

Moreover, even for a structure composed of a single crystal cell type, the mechanical properties can depend upon the direction of loading of the structure. As one example, a face-centered cubic metal structure experiencing a load positioned along an axis extending through the face-centered atoms will respond differently than the same structure when experiencing a load positioned off the same axis.

The overall shape of a component can be formed separately from its underlying crystal structure. Such an underlying crystal structure is referred to as its crystallographic orientation. A component's crystallographic orientation can be properly aligned with its specified shape, resulting in expected performance of the component. Under certain circumstances, however, the component can be formed with the crystallographic orientation situated differently than desired, or misaligned. Consequently, components formed from single-crystal structures can exhibit different mechanical properties when subjected to the same conditions. Preferably, components are constructed with a crystallographic orientation aligned to produce the most desirable mechanical properties of the component under its designed working position and conditions.

Because the performance of a component can depend on its crystallographic orientation, the crystallographic orientation of newly-formed components is often verified prior to installation or use. In this way, those components found to have a crystallographic orientation which will result in undesired performance of the component are identified prior to use. Such determination of crystallographic orientation is typically performed using x-ray crystallographic methods. Unfortunately, such techniques can be costly and time-consuming.

BRIEF SUMMARY

A method of detecting a deviation angle in a single-crystal metal structure is disclosed. The single-crystal metal structure has a crystallographic orientation, a length, a first side, a second side, and a first axis extending through the structure. The method comprises determining the length of the single-crystal metal structure along the first axis, transmitting a signal through the single-crystal metal structure from the first side, the signal oriented to propagate along the first axis, receiving the signal, determining a time-of-flight for the signal to traverse the length from the first side to the second side, determining a speed of the signal based on the time-of-flight and the length, and comparing the speed of the signal to a reference speed to detect the deviation angle.

Another method of detecting a deviation angle in a single-crystal metal structure is disclosed. The single-crystal metal structure can have a first axis extending across the single-crystal metal structure, a second axis extending in a direction transverse to the first axis, a first side, a second side, and a first length along the first axis between the first and second sides. The method comprises transmitting a first signal through the single-crystal metal structure from the first side, the first signal oriented to propagate in a first direction along the first axis and to reflect off the second side and return to the first side, receiving the first signal at the first side, determining a first time-of-flight for the first signal to traverse the first length from the first side to the second side and return to the first side, determining a first speed of the first signal in the single-crystal metal structure from the first length and the first time-of-flight, and comparing the first speed of the first signal to a first reference speed to detect the first deviation angle.

A method of verifying crystallographic orientation in a turbine airfoil is also disclosed. The turbine airfoil can have an axial line extending across the turbine airfoil, a first side and a second side along the airfoil stacking line, and a length therebetween. The method comprises transmitting a signal through the turbine airfoil from the first side with a transducer, the signal oriented to propagate along the airfoil stacking line and adapted to reflect off the second side and return to the first side, receiving the signal at the first side with the transducer, determining a time-of-flight for the signal to traverse the length and return, determining a speed of the signal in the turbine airfoil from the length and the time-of-flight, and comparing the speed to a reference speed to verify a deviation angle of crystallographic orientation relative to the airfoil stacking line is smaller than a threshold deviation angle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations and functions that may be performed by various computing components or devices. In practice, one or more processor devices can carry out the described operations, tasks, and functions. It should be appreciated that the various block components shown in the figures may be realized by any number of hardware, software, and/or firmware components configured to perform the specified functions.

Determining the crystallographic orientation of a single-crystal metal structure can permit reliance on certain mechanical properties of the metal structure. The more closely the crystallographic orientation is aligned with the designed orientation, the more closely it will exhibit the desired properties. Determining the actual crystallographic orientation is not necessary if it is possible to verify that the crystallographic orientation is within an acceptable range of positions. Therefore, to verify that single-crystal metal components will perform as desired, their crystallographic orientation can be inspected to detect deviation from the desired orientation. A component with an acceptably small deviation can then be used for its intended purpose. A component with a large deviation can be discarded.

A deviation in crystallographic orientation of a single-crystal metal structure from the desired orientation can be discovered by measuring the speed of sound along an axis of the metal structure. The speed of sound through a single-crystal metal structure varies based on the crystallographic orientation of the crystal. The speed of sound in a single-crystal metal structure along a dimension of known length can be determined by measuring the length of time required for a signal to travel through the structure. Accordingly, by determining the distance travelled through the metal structure along the line of propagation of a sound signal and the time required for the sound signal to traverse the length, a deviation in crystallographic orientation of the metal structure from the desired orientation can be detected.

Figure 1:
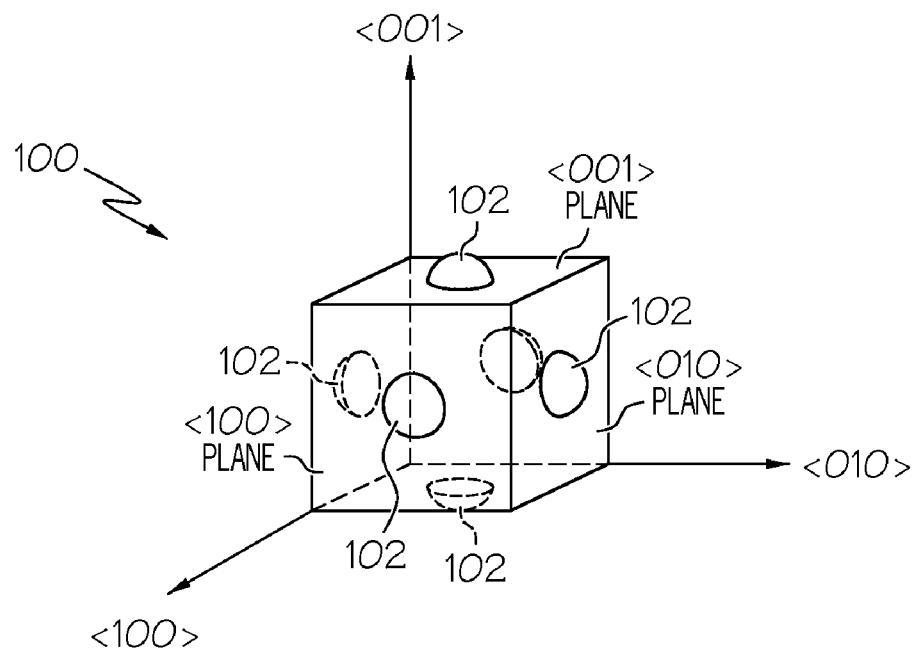
FIG. 1 is a diagram of the atomic configuration of a crystal structure.

FIG. 1 illustrates an exemplary atomic configuration of a face-centered cubic (FCC) metal crystal 100. Each atom 102 of the FCC crystal 100 is disposed in a central portion of the plane of the cubic cell. Accordingly, each cell of a FCC crystal 100 contains 3 complete atoms 102, one half of each atom located in the six cubic faces. Each cubic face is a plane described as extending perpendicular to an orthogonal direction.

Figure 2:
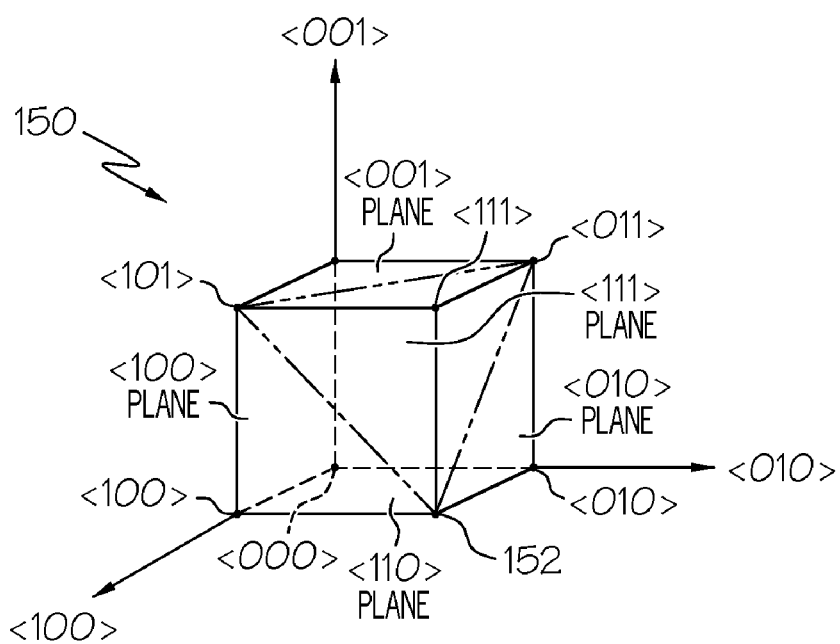
FIG. 2 is a diagram of a reference crystal structure.

FIG. 2 illustrates a reference cube 150 of a crystal structure for clear understanding of the directions and planes. The three orthogonal directions, <100>, <010>, and <001> correspond to three ninety-degree angles used in describing the three dimensional features of the cube 150. The cube 150 has eight vertices. One vertex is at the origin. The remaining seven vertices correspond to unit lengths in each of the three directions, including combinations of the positive unit directions. The vertices are described as vectors, where each vector component corresponds to one of the three orthogonal directions. Thus, the points can be described as <000>, <100>, <010>, <001>, <110>, <101>, <011>, and <111>. <110>, for example, represents a vertex occupying a position one unit length along the <100> direction and one unit length along the <010> direction, labeled 152.

Each direction has an associated plane. The plane is the face of the cube containing the point(s) designated. For example, the <100> plane is the plane corresponding to all points one unit in the <100> direction, namely the points <100>, <101>, <111>, and <110>.

Figure 3:
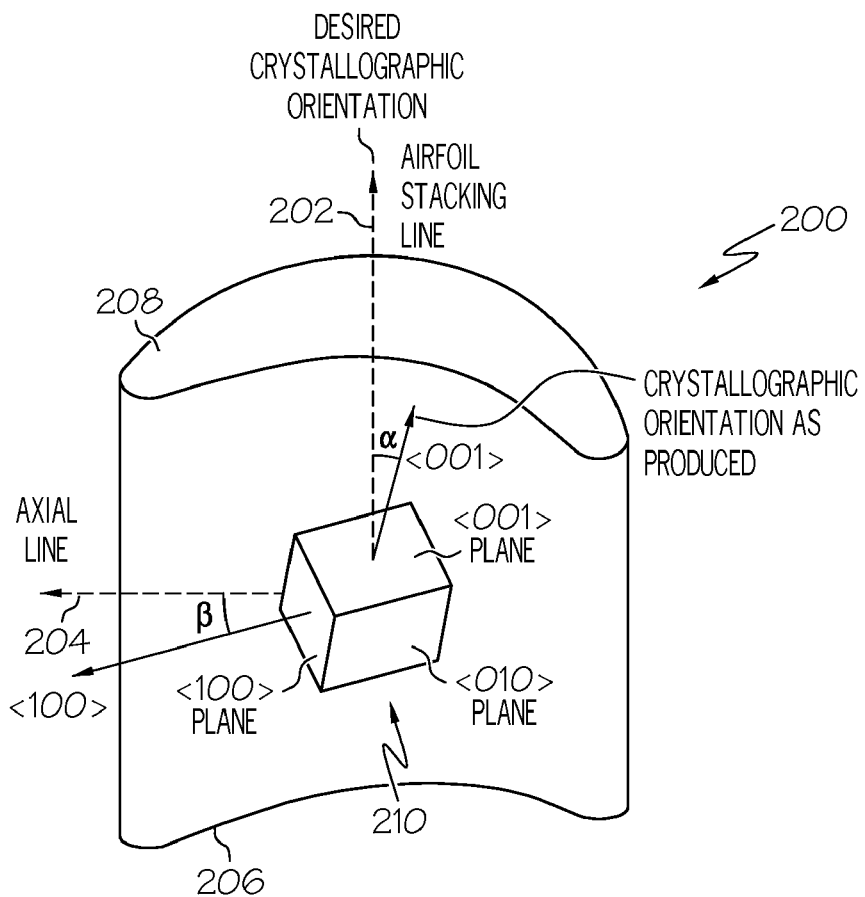
FIG. 3 is a schematic diagram of a reference crystal structure and a turbine blade.

FIG. 3 illustrates an exemplary turbine airfoil 200 with a reference cube 210 schematically positioned for illustrative purposes. Although a turbine airfoil 200 is used for descriptive purposes, any single-crystal metal structure can be used. For example, a turbine nozzle or vane, as well as non-turbine related structures, can be inspected using the methods and systems described herein. Additionally, while a single-crystal structure of a nickel or nickel alloy is described, other single-crystal metal structures can be used, including cobalt and nickel-iron alloys. Moreover, such metals can have face-centered cubic structures. Other atomic cubic configurations and metal crystal structures also can be used.

The turbine airfoil 200 has an airfoil stacking line 202 extending along its length. Crystallographic orientation refers to the orientation of the crystalline configuration which forms the metal structure. The airfoil stacking line 202 indicates the desired axis or line along which one of the orthogonal directions of the crystal cell can be aligned to optimize the mechanical properties of the single-crystal structure in the designed component. Other desirable orientations are possible depending on the specific design. In the exemplary embodiment of FIG. 3, the airfoil stacking line 202 indicates the preferred direction of orientation of the primary crystallographic orientation.

For certain crystal configurations, including face-centered cubic, body-centered cubic, and simple cubic, alignment of any of the orthogonal directions with the airfoil stacking line 202 results in the exhibition of identical mechanical properties. Thus, whether the <100> direction, <010> direction, or <001> direction are aligned with the airfoil stacking line 202, the mechanical properties of the turbine airfoil 200 are substantially the same. The orthogonal direction most closely aligned with the airfoil stacking line 202 is considered primary. Accordingly, determining the direction of primary crystallographic orientation is the determination of the direction in which the orthogonal direction most closely aligned with the airfoil stacking line 202 is situated.

In the illustrated example, the airfoil stacking line 202 extends through the center of the cross-section of the turbine airfoil 200. Typically, such a stacking line of a component indicates a desired direction in which the single-crystal structure should provide specified mechanical properties. In the turbine airfoil 200, the longitudinal axis is desirable because a single-crystal structure so aligned provides the desired mechanical properties under expected operational conditions. The turbine airfoil 200 has a first side and a second side, the length, l, representing the distance therebetween. Such sides can be the airfoil root 206 and airfoil tip 208, as shown, or other features or surfaces appropriate to the embodiment. In the illustrated embodiment, the axial surfaces 206, 208 of the turbine airfoil 200, are disposed at either end of the turbine airfoil 200 along the airfoil stacking line.

In the illustrated example, the orthogonal direction associated with the primary crystallographic orientation is the <001> direction. For the turbine airfoil 200, the airfoil stacking line 202 represents the axis of preferred primary crystallographic orientation. The reference cube 210 is situated such that the <001> direction is not precisely aligned with the airfoil stacking line 202. Accordingly, an angle α exists between the <001> direction and the airfoil stacking line. Angle α is known as the primary deviation angle. Typically, an allowable primary deviation angle is between about 0 and 15 degrees. In this range, the component will exhibit predictable and desirable mechanical properties.

Due to the methods used to fabricate single-crystal metal structures, such as the exemplary turbine airfoil 200, the angle α is typically small and usually falls within 0 to 15 degrees. For example, when a single-crystal metal structure is cast, a selector or plate can be used to direct the crystal growth direction. As a result, the crystal grows during solidification along the orthogonal directions of its atomic configuration.

For reasons similar to controlling the primary crystallographic orientation along an axis such as the airfoil stacking line 202, it is desirable in some embodiments to have an orthogonal direction of the single-crystal structure aligned with a secondary direction such as the axial line 204. While the illustrated embodiment specifically identifies the axial line 204, other components may have different directions in which secondary crystallographic alignment is preferable. Each preferred secondary direction can be specific to the embodiment.

For this example, the axial line 204 is the desired secondary crystallographic alignment direction, and disposed at a 90° angle to the airfoil stacking line 202. In the illustrated embodiment, the axial line 204 represents an axis extending through the width of the turbine airfoil 200 in a transverse direction to the airfoil stacking line 202. The secondary deviation angle of crystallographic orientation, β, is the angle between the secondary crystallographic orientation and the desired secondary crystallographic orientation.

The reference cube 210 is disposed such that the <100> direction is most closely aligned with the axial line 204. As previously described, because of the symmetry of the reference cube, other directions can be the most closely aligned, and the selection of <100> is for illustrative purposes. The secondary crystallographic orientation refers to the direction in which the <100> direction is positioned relative to the axial line 204. Thus, β is the angle between the <100> direction and the axial line 204. In other components and embodiments where the axial line 204 is replaced by a different preferred secondary crystallographic direction axis, β is the angle between the appropriate axis and the secondary orthogonal direction.

Because the reference cube 210 can be rotated about three axes, the two deviation angles of crystallographic orientation, α and β, can vary independently. Thus, in certain embodiments, α can be near 0°—indicating desirable alignment with the primary component axis, and often the result of fabrication, within a small tolerance—while β can vary from 0 to 45°, rotated about the primary axis. When rotated greater than 45°, however, another orthogonal direction more closely approaches the secondary axis, and β begins to decrease towards 0° as rotation continues. When the two angles are fixed, however, the third orthogonal direction has a definite, fixed direction. Accordingly, while it is possible to align the third orthogonal direction with an axis if desired, it is only necessary to inspect the primary and secondary deviation angles to detect an unacceptably deviate crystallographic orientation.

Figure 4:
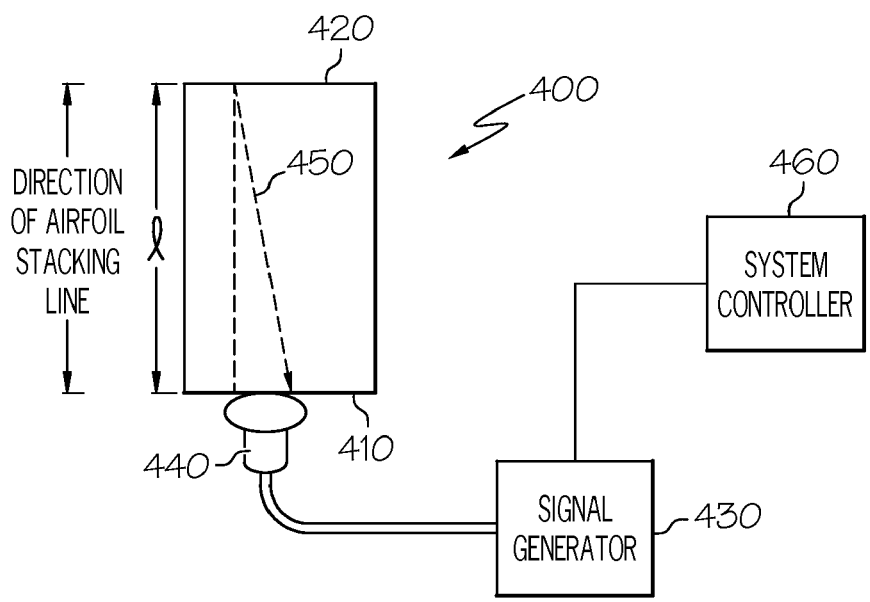
FIG. 4 is schematic representation of an embodiment of a system for detecting deviation in crystallographic orientation of a single-crystal structure.

FIG. 4 depicts a schematic illustration of a turbine airfoil 400 having a first side 410 and a second side 420, the two sides 410, 420 separated by a length l. As can be seen, a signal generator 430, coupled to a signal transducer 440, can be used to provide the signal 450. The signal generator 430 can be coupled to a system controller 460. The system controller 460 can operate and receive information from the signal generator 430, as well as control the operation of other system components.

The signal 450 will propagate through the turbine airfoil 400 and reflect off the surface of the second side 420. After reaching the second side 420, the signal 450 will have traveled the distance of the length l. The signal 450 will then return to the first side 410, having now traveled a distance of twice the length l. Although the signal 450 is depicted as rebounding or reflecting from the inner surface of the second side 420 at an angle, in practice it will typically reflect substantially directly towards the first side 410, and the angle is an offset shown for clarity.

In the illustrated embodiment, the signal 450 is a sound wave at an ultrasonic frequency, though other frequencies can also be used. The signal generator 430 preferably is capable of producing a spectrum of signals and transmitting them with the signal transducer 440. Similarly, the signal generator 430 can additionally receive the reflected signal 450 with the signal transducer 440.

Figure 5:
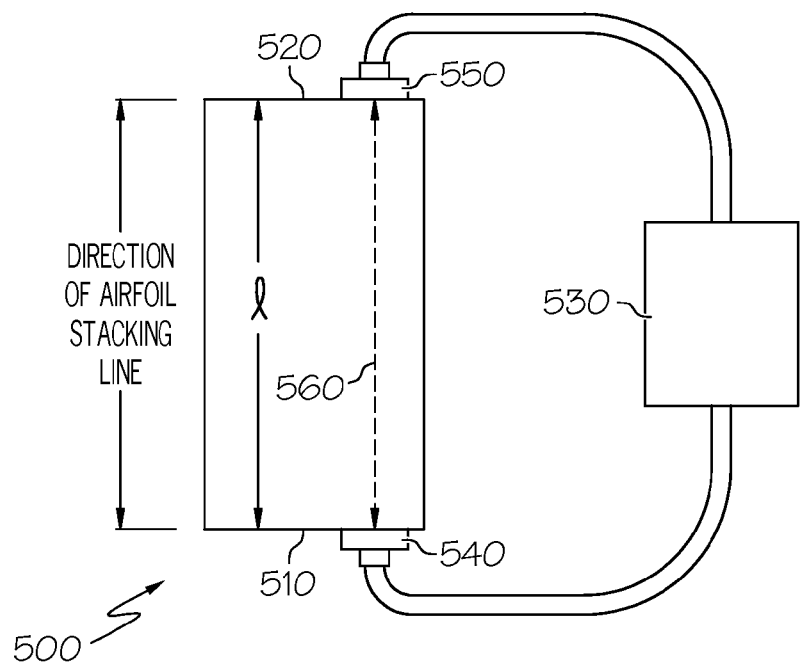
FIG. 5 is a schematic representation of another embodiment of a system for detecting deviation in crystallographic orientation of a single-crystal structure.

In alternate embodiments, the signal generator 430 can employ additional or separate transducers or components to perform the transmission and receiving steps. One such alternate embodiment is depicted in FIG. 5, in which a turbine airfoil 500 having first and second sides 510, 520 is inspected by a signal generator 530. The signal generator 530 is coupled to a first transducer 540 and a second transducer 550. As shown, a signal 560 can be transmitted by the first transducer 540 and received by the second transducer 550 after the signal has traversed the length, l, of the turbine airfoil 500. Other embodiments can use multiple transducers on a single edge or side, or have any other arrangement or configuration suitable to transmit a signal through a metal structure and receive it again with or without one or more reflections of the signal within the metal structure.

With reference again to FIG. 4, while the signal generator 430 is functionally described as producing and receiving signals with the signal transducer 440, it can also be coupled to or contain components suitable to carrying out the operations and steps of the method 600 further described below. Thus, in some embodiments, the signal generator 430 can operate independently to complete additional steps of the method 600. In other embodiments, it can cooperate with other components which independently perform steps of the method 600, exchanging information through any suitable means to accomplish the tasks.

Additionally, in some embodiments, the signal generator 430 can be controlled by another component, such as the system controller 460, to perform its functions, as illustrated in FIG. 4. The system controller 460 can be adapted to receive information, such as times-of-flight and/or signal speeds from the signal generator 430 and perform subsequent operations, such as comparing the speed and/or time-of-flight to reference values. Additionally, the system controller 460 can record any produced information, or direct other system components to record the information.

Figure 6:
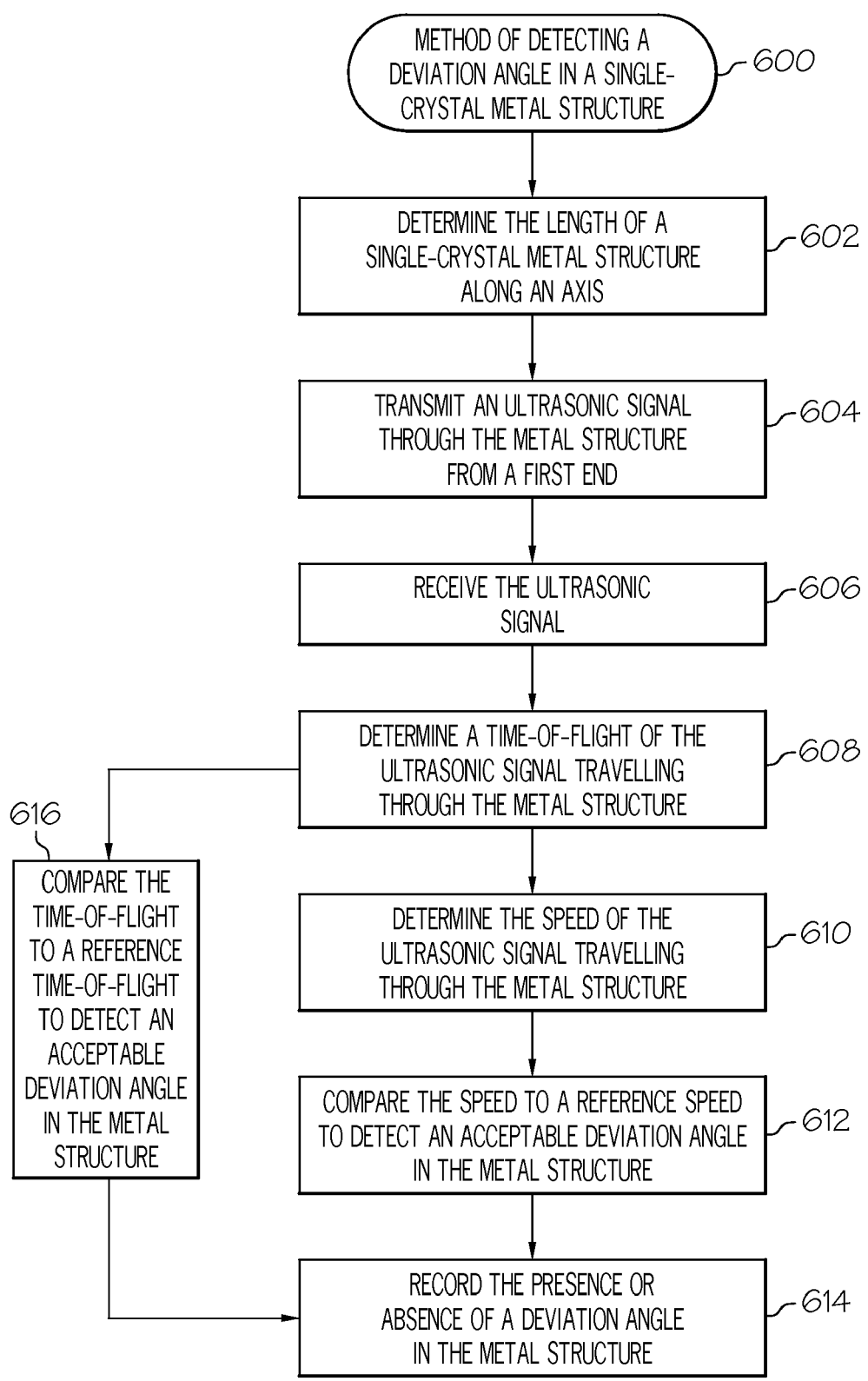
FIG. 6 is a flowchart that illustrates a method of detecting deviation in crystallographic orientation of a single-crystal structure.

FIG. 6 illustrates a method of detecting a deviation angle in a single-crystal metal structure. The various tasks performed in connection with method 600 can be performed by software, hardware, firmware, or any combination thereof. For illustrative purposes, the following description of method 600 may refer to elements mentioned in connection with FIGS. 1-5. In practice, portions of method 600 may be performed by different elements of the described system, e.g., an ultrasonic transducer, a controller, or an ultrasonic transmitter and/or receiver. It should be appreciated that method 600 may include any number of additional or alternative tasks, the tasks shown in FIG. 6 need not be performed in the illustrated order, and method 600 may be incorporated into a more comprehensive procedure or process having additional functionality not described in detail herein. Additionally, although the method 600 is described in the context of a turbine airfoil, other components and structures having similar geometries, features, and properties can be similarly used, such as vanes or cast blisks. The method 600 can be used to detect deviation angles in either primary or secondary crystallographic orientation, depending on its application.

Because speed is defined as a distance traveled over an interval of time, knowledge of any two of speed, time, and distance allow for computation of the third. The speed of sound in a single-crystal metal structure varies depending upon the primary and secondary angles of crystallographic orientation. Accordingly, primary and secondary deviation angles in a component can be detected through non-invasive, non-destructive inspection.

As a turbine airfoil is being used for descriptive purposes, it is desirable to detect a primary or secondary deviation angle after fabrication. Preferably, to detect a primary deviation angle, the turbine airfoil is inspected along a feature that contains continuous material along the inspection length, such as the leading edge or an airfoil rib. Similarly, to detect a secondary deviation angle, the airfoil is inspected along a transverse direction. Preferably, the length over which the single-crystal metal structure to be examined is first determined (task 602) using conventional measurement techniques. The length corresponds to the dimension along which a signal, ultrasonic or otherwise, will travel. Accordingly, determining the distance the signal will travel is an important step in calculating the speed of the signal in the metal structure. Thus, while a length is described, the appropriate dimension for other components can be used.

Determining a dimension of the metal structure (task 602) can be accomplished by any suitable means of measurement, including inspection with ultrasonic devices, as described in U.S. Pat. No. 7,272,529, the entirety of which is incorporated herein by reference. In some practices of the method, the length of the metal structure can be established a priori, such as by large-scale production of a given structure, automated processes, and the like.

A signal is then transmitted through the metal structure from a first side (task 604). The signal is subsequently received (task 606). Reception of the signal (task 606) can occur before or after reflection, as described above. After transmission and reception of the signal, a system controller, or other appropriate component, can determine its time-of-flight (task 608). The time-of-flight is the duration of time required for the signal to traverse a set distance within the component. For example, in the embodiment illustrated in FIG. 4, the time-of-flight of the signal 450 would be the time required to travel a distance of twice the length l of the turbine airfoil 400. The signal generator 430 can determine the time-of-flight by measuring the temporal interval between transmission of the signal 450 (task 604) and the reception of the signal (task 606).

After determining the time-of-flight, the system controller, or other component as described above, can determine the speed of the signal in the metal structure (task 610). Because the speed of the signal is equal to the distance traveled during the time-of-flight divided by the time-of-flight and the traveled distance is known, the speed can be simply determined. Because the signal in the exemplary embodiment is an ultrasonic signal, it travels through the component at the speed of sound in the component. Accordingly, by determining the speed of the signal, the speed of sound along the direction of travel of the signal in the component is determined.

Figure 7:
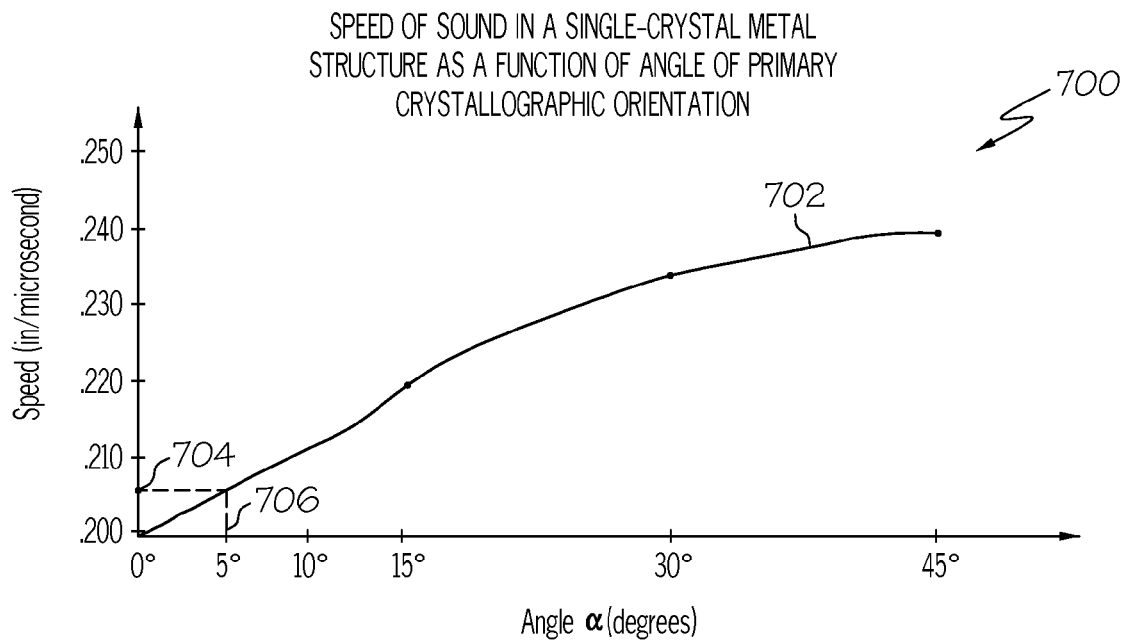
FIG. 7 is a diagram illustrating the variation of the speed of sound in single-crystal structures having different crystallographic orientations.

One example, as shown in FIG. 7, with ongoing reference made thereto. Although a graph 700 is shown, precise reference data points can be known for primary and/or secondary deviation angles of a typical structure. Some references can include data points for fractions of degrees of angle $\alpha$ or $\beta$ as desired for accuracy. The speed of sound in the component as measured preferably matches the speed in sound in a component having a crystallographic orientation aligned with the desired orientation. If the crystallographic orientation varies from the desired orientation, the measured speed of sound in the component will differ. A reference speed corresponding to the threshold for an acceptable deviation angle can have been previously established using other methods.

Data points are typically determined during x-ray crystallography of a sample of the single-crystal metal structure. Thus, after a precise crystallographic orientation is established with x-ray crystallography, the speed of sound can be measured through varying values of deviation angles $\alpha$ or $\beta$. Subsequently, the determined speeds can be used as reference speeds, as the association between deviation angles $\alpha$ or $\beta$ and the speed of sound has already been determined. Thus, one implementation of x-ray crystallography can serve as a reference basis for many subsequent inspections of crystallographic orientation, rather than repeating the costly and time-consuming x-ray crystallography practice. After the empirical reference measurements have been obtained, the reference data can be stored in the signal generator 430, system controller 460, or other component of the system for use as described below.

In one exemplary embodiment, the maximum permissible primary deviation angle is 15 degrees. As can be seen from graph 700, the corresponding measured speed of sound in the component must be less than 0.220 inches per microsecond for the component to have a permissible primary deviation angle. Similarly, if the measured speed of sound in the component is 0.200 inches per microsecond, it has been determined that the primary deviation angle is 0 degrees, meaning that the crystallographic orientation is aligned with the desired orientation. Accordingly, when comparing the measured speed to a reference speed, such as 0.220 inches per microsecond, it can be determined that the primary deviation angle is acceptably small when the measured speed is less than the reference speed. It is not necessary to determine the exact primary or secondary deviation angles. If a permissibly small deviation angle is detected in an examined component, it can be put to its intended use without costly determination of the precise crystallographic orientation.

Accordingly, once the speed of the signal has been determined in task 610, it can be compared to a reference speed (task 612). As one example, if a speed of 0.205 in/microsecond was determined after transmission and reception of the signal, the speed can be associated with a position along the curve 702. Specifically the determined speed has a value at point 704 along the axis indicating the speed of the signal. The corresponding deviation angle $\alpha$ is determined to be 5°, as shown by the relationship 706.

Although it is advantageous in some circumstances to determine exact speed and angle, to verify acceptable crystallographic orientation, it is only necessary to verify the measured speed is within a designated range. Thus, for a component where an acceptable deviation angle is less than 15 degrees, the speed of sound measured in a component should be less than 0.220 inches per microsecond. Accordingly, the present measurement of 0.205 inches per microsecond satisfies the condition. The component therefore contains a crystallographic orientation with an acceptably small deviation angle. Therefore, the speed in task 610 can be compared to a reference speed to detect if an impermissible deviation angle exists in the crystallographic orientation of the metal structure, as compared to the desired orientation (task 612).

In some embodiments, the measured speeds and/or deviation angles can be recorded (task 614). Such recordation can be accomplished manually, performed by the signal generator, system controller, or through any other suitable technique.

After determining the time-of-flight of the signal (task 608), it can sometimes be advantageous to compare the time-of-flight to a reference time-of-flight, directly, rather than performing the intermediary step of determining the speed of sound in the component for comparison. Comparison of the measured time-of-flight against a reference time-of-flight results in the detection of an acceptable or unacceptable deviation angle (task 616). Subsequently, the presence or absence of an acceptable deviation angle can be recorded, as described above (task 614).

It is possible to perform the method described for verifying the secondary deviation angle in a single-crystal metal component as well. As one example, with reference again to FIG. 3, detection of an impermissible secondary deviation angle can be accomplished with measurements taken along a direction coinciding with the airfoil line 204. Determination of the speed of sound in the component can be made from the time-of-flight of the signal and the distance traveled in a manner similar to that described above. Subsequently, comparison of the measured speed to reference speeds previously established can be used to detect an unacceptable secondary deviation angle. The information regarding the measured speed, time of flight, and/or deviation angle can be subsequently recorded.

When practiced with certain types of manufacturing, the process can be repeated many times on a large number of components with an established reference standard for sound speed or time of flight corresponding to an acceptable deviation angle. For example, a plurality of turbine airfoils can be cast or created using a consistent manufacturing process. Then, one or more deviation angles α and/or β can be examined using a suitable method such as x-ray diffraction. Additionally, the associated dimension of interest, such as the length or width, along which a component can be determined.

In some embodiments, the method 600 can be practiced where the desired orientation is rotationally displaced from the axis of measurement. For example, in certain cases the desired crystallographic orientation may be aligned with an axial line. Practical considerations can inhibit direct inspection because of the geometry of the structure of limitations in instrument placement. In certain circumstances, the metal structure can be inspected in a transverse direction. In some circumstances, the transverse direction can be orthogonal to the desired direction, although any transverse direction can be used for inspection once the rotation is accounted for.

Inspection in a transverse direction can result in a measured speed of sound higher than if the component were inspected along one of the orthogonal crystal directions. In such circumstances, the reference speed of sound can be adjusted to reflect the higher speed. Accordingly, the reference speeds corresponding to acceptable deviation angles can be unique to each component or component model, and even to each inspection position on the component.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of detecting a deviation angle in a single-crystal metal structure having a crystallographic orientation, the single-crystal metal structure having a length, a first side, a second side, and a first axis extending through the structure, the method comprising:
   determining the length of the single-crystal metal structure along the first axis;
   transmitting a signal through the single-crystal metal structure from the first side, the signal oriented to propagate along the first axis;
   receiving the signal;
   determining a time-of-flight for the signal to traverse the length from the first side to the second side;
   determining a speed of the signal based on the time-of-flight and the length; and
   comparing the speed of the signal to a reference speed to detect the deviation angle.

2. The method of claim 1, wherein transmitting the signal comprises transmitting a sound wave.

3. The method of claim 2, wherein transmitting a sound wave comprises transmitting a sound wave at an ultrasonic frequency.

4. The method of claim 1, wherein transmitting the signal through the single-crystal metal structure comprises transmitting the signal through a turbine airfoil.

5. The method of claim 1, wherein transmitting the signal comprises transmitting the signal from a first transducer on the first side.

6. The method of claim 5, wherein receiving the signal comprises receiving the signal with the first transducer on the first side after the signal has rebounded within the single-crystal metal structure.

7. The method of claim 5, wherein receiving the signal comprises receiving the signal with a second transducer on the second side.

8. The method of claim 1, wherein determining the length of the single-crystal metal structure comprises transmitting an ultrasonic signal through the single-crystal metal structure.

9. The method of claim 1, wherein determining the speed of the signal based on the time-of-flight and the width comprises comparing the time-of-flight to a reference time-of-flight.

10. The method of claim 9, further comprising information indicative of the presence of the deviation angle.

11. A method of detecting a first deviation angle in a single-crystal metal structure having a first axis extending across the single-crystal metal structure and a second axis extending in a direction transverse to the first axis, the single-crystal metal structure having a first side, a second side, and a first length along the first axis between the first and second sides, the method comprising:

transmitting a first signal through the single-crystal metal structure from the first side, the first signal oriented to propagate in a first direction along the first axis and to reflect off the second side and return to the first side;

receiving the first signal at the first side;

determining a first time-of-flight for the first signal to traverse the first length from the first side to the second side and return to the first side;

determining a first speed of the first signal in the single-crystal metal structure from the first length and the first time-of-flight; and comparing the first speed of the first signal to a first reference speed to detect the first deviation angle.

12. The method of claim 11, wherein transmitting the first signal comprises transmitting an ultrasonic signal.

13. The method of claim 11, wherein the first axis extends along an airfoil stacking line.

14. The method of claim 13, wherein detecting the deviation angle comprises detecting an angle between an atomic configuration of the single-crystal metal structure and the airfoil stacking line.

15. The method of claim 14, further comprising:

transmitting a second signal through the single-crystal metal structure in a second direction, wherein the second direction is transverse to the first direction and the first axis, the single-crystal metal structure having a second length along the second direction;

receiving the second signal;

determining a second time-of-flight for the second signal to traverse the single-crystal metal structure in the second direction;

determining a second speed of the second signal in the single-crystal metal structure from the second length and the second time-of-flight; and comparing the second speed to a second reference speed to detect a second deviation angle.

16. The method of claim 11, wherein transmitting the first signal comprises transmitting the first signal through a single-crystal structure composed of nickel.

17. The method of claim 11, further comprising recording information indicative of the presence of the first deviation angle.

18. A method of verifying crystallographic orientation in a turbine airfoil having an axial line extending across the turbine airfoil, a first side and a second side along the airfoil stacking line and a length therebetween, the method comprising:

transmitting a signal through the turbine airfoil from the first side with a transducer, the signal oriented to propagate along the airfoil stacking line and adapted to reflect off the second side and return to the first side;

receiving the signal at the first side with the transducer;

determining a time-of-flight for the signal to traverse the length and return;

determining a speed of the signal in the turbine airfoil from the length and the time-of-flight; and comparing the speed to a reference speed to verify a deviation angle of crystallographic orientation relative to the airfoil stacking line is smaller than a threshold deviation angle.

19. The method of claim 18, wherein transmitting the signal comprises transmitting an ultrasonic signal.

20. The method of claim 18, further comprising maintaining a set of reference data, the reference data including the reference speed and a reference deviation angle associated with the reference speed.

\* \* \* \* \*